March 17, 1953 M. RONICK 2,631,495
SLIDE PROJECTOR-PHONOGRAPH COMBINATION
Filed July 10, 1950 3 Sheets-Sheet 1
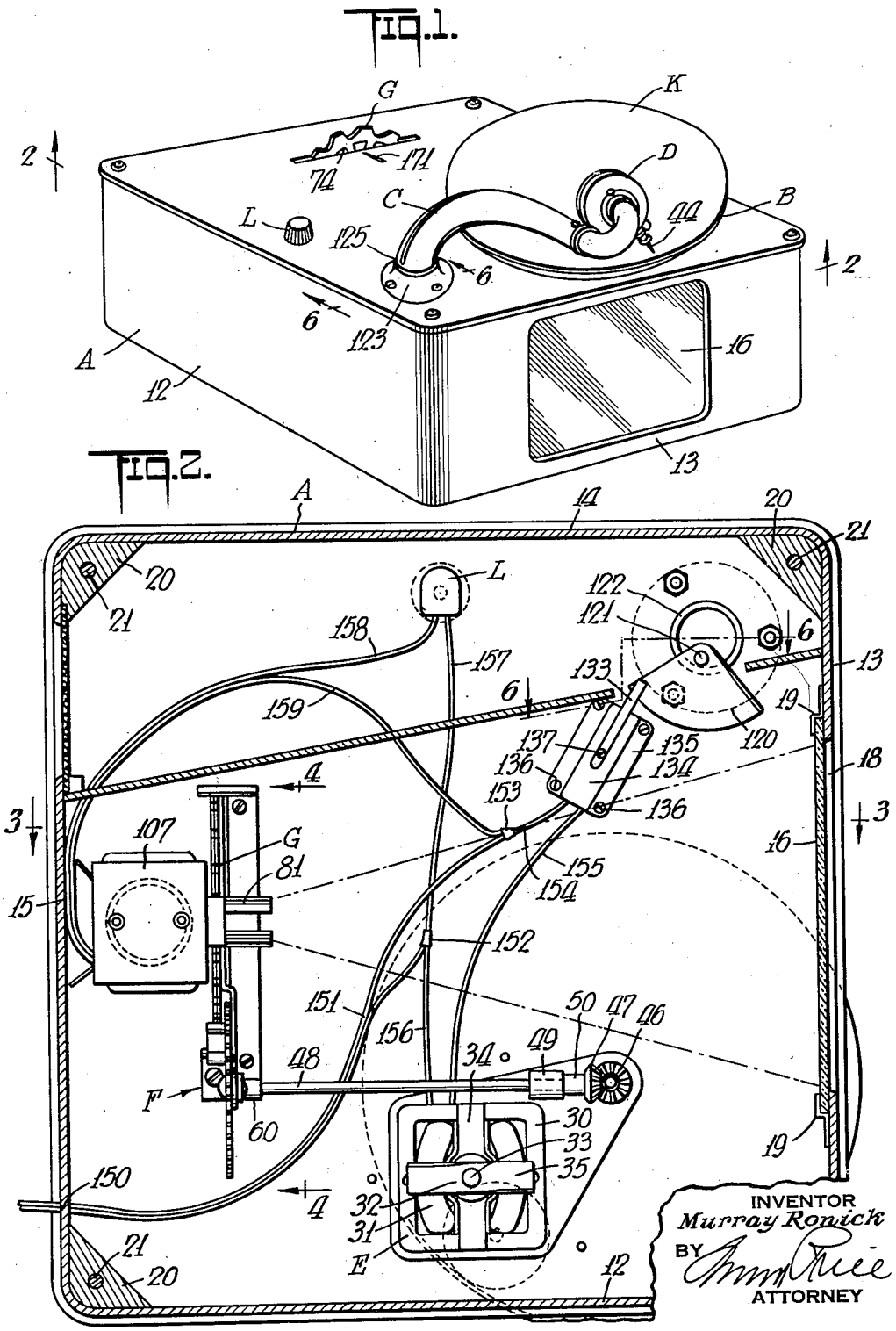
INVENTOR
Murray Ronick
BY
ATTORNEY INVENTOR
Murray Ronick
BY
ATTORNEY

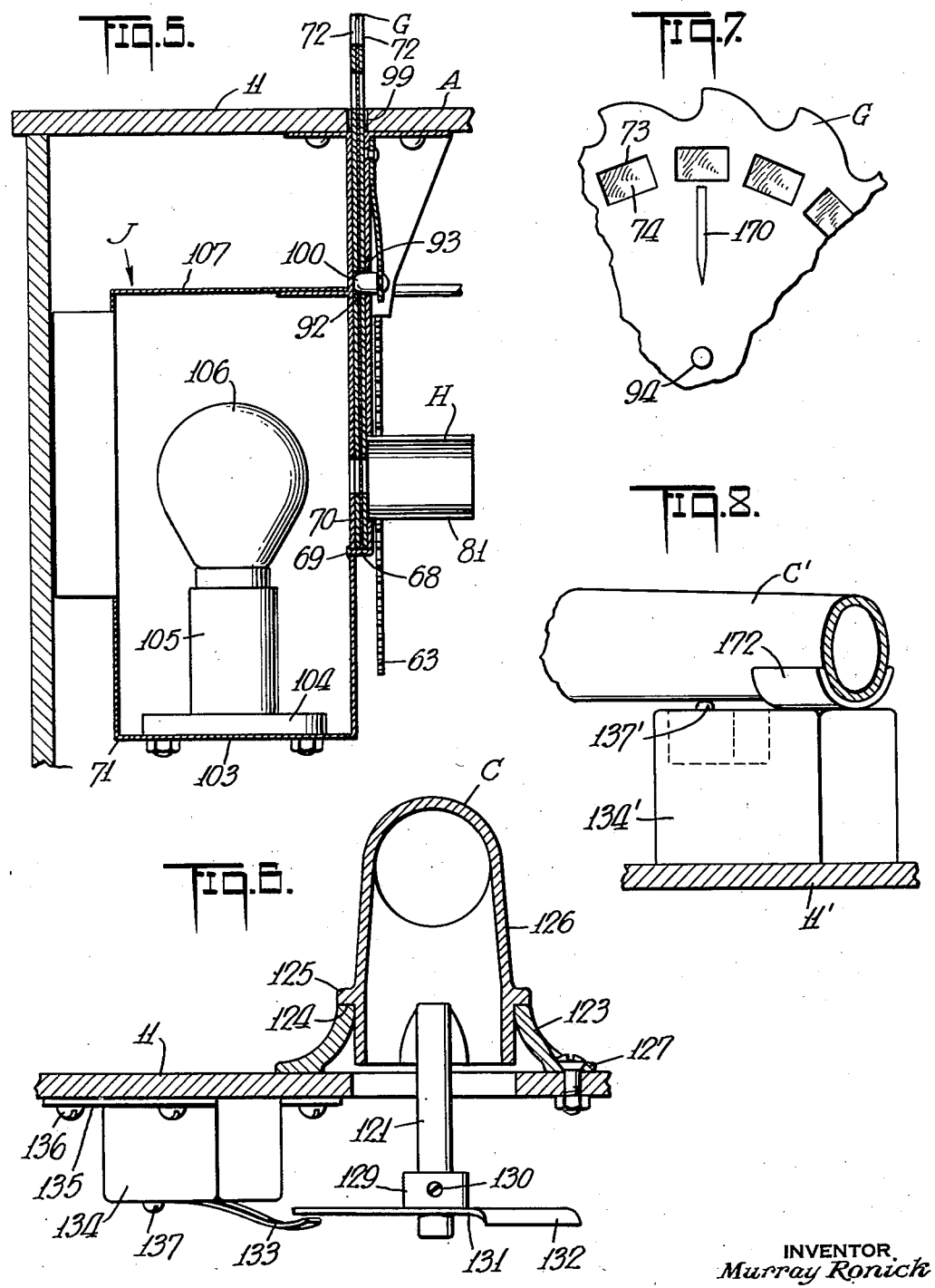

Patented Mar. 17, 1953

2,631,495

UNITED STATES PATENT OFFICE 2,631,495

SLIDE PROJECTOR-PHONOGRAPH COMBINATION

Murray Ronick, New York, N. Y.

Application July 10, 1950, Serial No. 172,817

7 Claims. (Cl. 88—27)

The present invention relates to a slide projector-phonograph combination, and it particularly relates to a synchronized device for projecting slides in the home while using a turn-table phonograph construction for accompanying the same with sound.

In the household, for entertainment of children and adults, and also for simultaneously projecting sound and pictures upon a screen or wall, it is generally not desirable to obtain large and expensive equipment required to project ordinary moving picture film upon the wall with a sound track.

This equipment not only requires considerable skill for operation but is readily subject to derangement and is not at all satisfactory for use in connection with children.

It is among the objects of the present invention to provide a readily operable, inexpensive combination slide projector and phonograph combination which will not be readily subject to derangement, which will not require the purchase and use of relatively expensive film with sound tracks and which may be readily operated by children manually or from ordinary electrical supply sources within the household.

Another object is to provide a slide projector and phonograph combination which will make use of substantially standard, flat turn-table phonograph type records and which will permit the utilization of readily available, inexpensive slide material and which does not require provision or manufacture of a supply of expensive and unusual parts but will permit a child or other person in the household to use familiar equipment to obtain both a projection of pictures and a sound of substantial synchronism therewith.

Another object is to provide a compact, lightweight, inexpensive, readily manufactured and repaired phonograph slide projector combination which will make use of flat, circular records now readily available upon the market and will not require any expensive or complicated mechanism requiring trained operators or readily subject to derangement or destruction by children or others.

Still further objects and advantages will appear in the more detailed description of the invention set forth below, it being understood, however, that this more detailed description is given by way of illustration and explanation only and not by way of limitation, since various changes therein may be made by those skilled in the art without departing from the scope and spirit of the present invention.

In accomplishing the above objects, there is provided the usual rectangular, low height cabinet for a flat turn-table phonograph in which there is provided a spring or electric motor for rotating the turn-table of the phonograph together with a small, compact projector system which will both project and rotate a circular slide disc device.

The disc device is preferably so arranged that it may be readily inserted into a slot in the top of the base for the turn-table and the edges of such discs are notched so that the disc will turn in coordination with the turning of the record so as to assure a substantial synchronism of the pictures and the projection.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Fig. 1 is a corner perspective view of the top of a slide projector-phonograph combination of the present invention, showing the tone arm, flat turn-table, and edge of the projector disc in position within the cabinet.

Fig. 2 is a transverse horizontal sectional view taken upon the line 2—2 of Fig. 1.

Fig. 5 is a fragmentary transverse vertical sectional view taken upon the line 5—5 of Fig. 4.

Fig. 6 is a fragmentary transverse vertical sectional view taken upon the line 6—6 of Fig. 2.

Fig. 7 is an enlarged fragmentary elevational view of a portion of the circular slide projector disc showing the starter indication device.

Fig. 8 is a detail fragmentary view of an alternative tone arm construction illustrating the manner of utilizing such tone arm to operate a micro-switch and discontinue operation of the phonograph.

Referring to Figs. 1 to 7, there is shown a phonograph box A containing the necessary mechanism which carries the disc record turntable B and also the tone arm C having the stylus head D.

Figure 3:
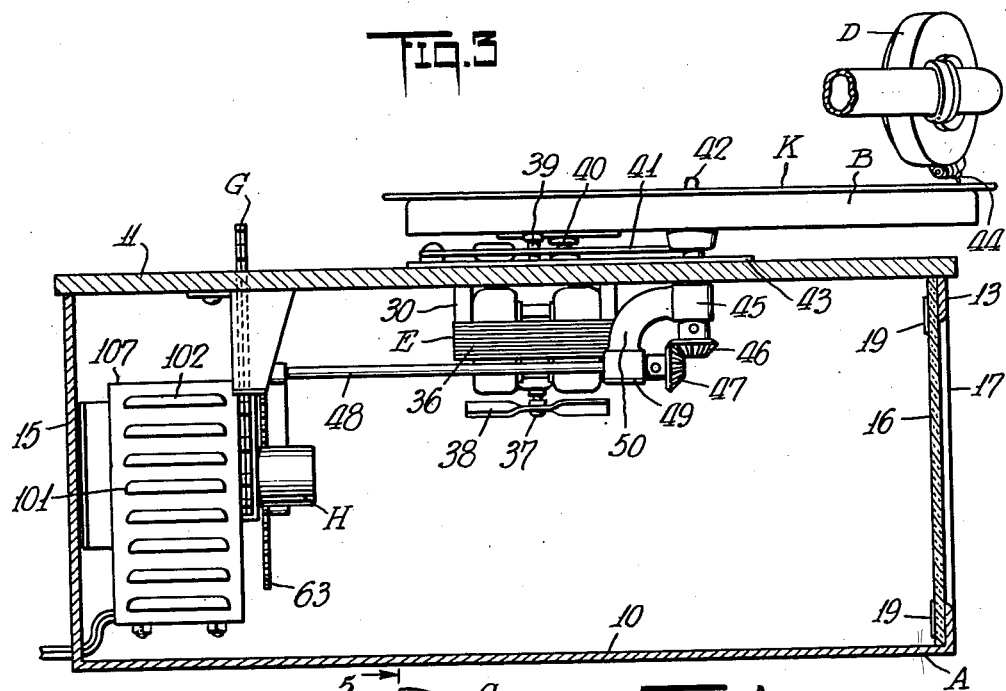
Fig. 3 is a transverse vertical sectional view taken upon the line 3—3 of Fig. 2.

The turn-table is driven by means of the motor arrangement E (see Figs. 2 and 3).

The motor arrangement E also drives the drive mechanism F for the projector slide disc G.

Associated with the rotatable slide disc G is the lens system H of the lamp box or source of light J.

Figure 4:
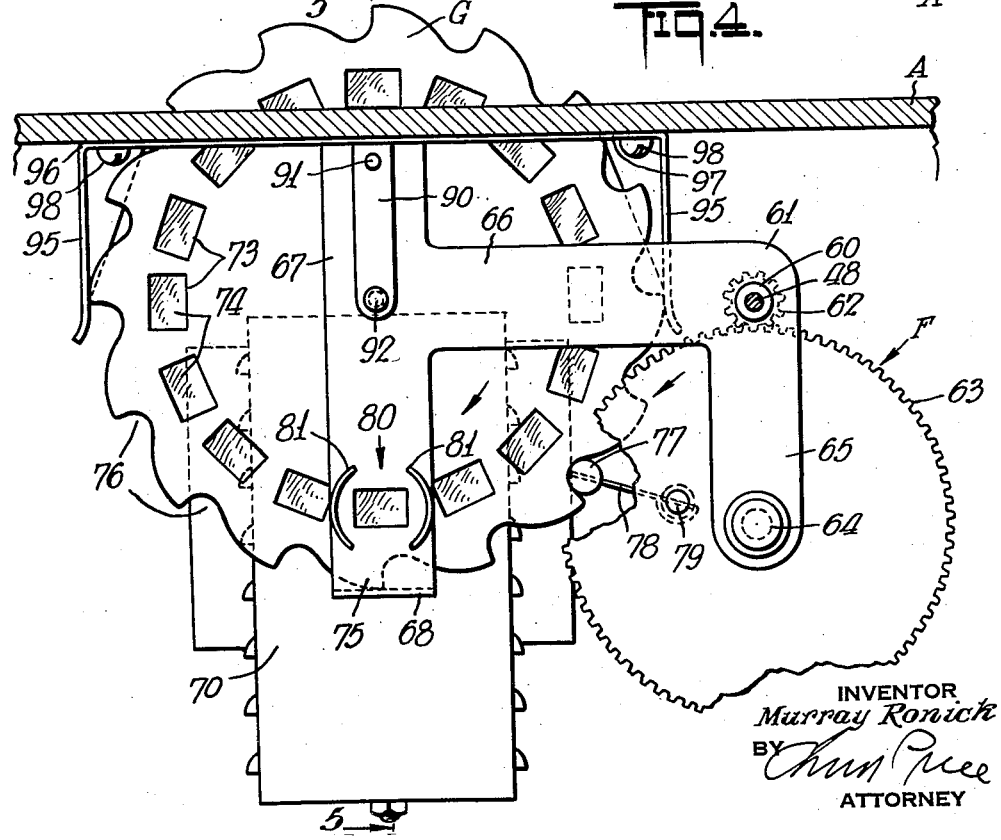
Fig. 4 is a fragmentary transverse vertical sectional view taken upon the line 4—4 of Fig. 2 and upon an enlarged scale as compared to Fig. 2.

Referring to Figs. 2, 3 and 4, the box A is provided with a bottom wall 10 and a top wall 11 with the side walls 12, 13, 14 and 15.

The wall 13 carries the window 16, which covers the opening 18 and is held in position by the clips 19.

The corners of the box A are reinforced, as shown, by the corner pieces 20 held in position by the screws or pins 21.

Suspended on the lower side of the top 11 of the box A is the body 30 of the motor E.

As shown in Fig. 2, the motor has a square body casing 30 with a field 31 and a rotor 32. The shaft 33 of the rotor is mounted within bearings by means of the spider elements 34 and 35.

The motor may be enclosed by the laminated pile 36.

The lower portion of the shaft of the motor, as indicated at 37 in Fig. 3, carries a fan 38.

The motor shaft 33 extends upwardly through the top board 11 of the box A and has an extension 39 which, through a suitable reduction, as indicated at 40 and 41, will drive the shaft 42 of the turn-table B. The reducing mechanism 39—40—41 is mounted upon a plate 43 on the top board 11.

The turn-table B is shown as carrying a record K. This record is engaged by the stylus 44 of the sound head D which is carried upon the tone arm C.

The shaft 42 of the turn-table B extends downwardly through the bearing 45 (see Fig. 3) and drives a bevel gear 46. The bevel gear 46 meshes with a bevel gear 47 on the end of the shaft 48 which has a bearing at 49 connected by the neck 50 to the bearing 45.

The shaft 48 extends over to the hub 60 which is supported by the bracket 61. The hub 60 carries the gear 62 which drives the large gear 63. The large gear 63 has a bearing 64 in the depending arm 65 of the bracket 61.

The bracket 61 has a horizontal arm 66 and a vertical arm 67.

The inturned, lower portion 68 of the vertical arm 67 is mounted or riveted at 69 in the sides 70 of the box 71 of the light source J (see Fig. 5).

Between the vertical arm 67 and the wall 70 of the box 71 will be positioned the slide-carrying disc G which consists of two sheets of material 72 having coinciding openings 73 between which is fastened the slides 74.

The inturned flange 68 acts as a bottom rest for the lower edge 75 of the disc G. The edges of the disc G are provided with the notches 76 which cooperate with the turning device 77. The device 77 is mounted on leaf spring 78 connected to the pin 79 on the gear 63. The device 77 to turn the disc G may also be mounted directly upon the gear 63 without an intermediate spring 78.

The ratio of the gears 62 and 63 and the bevel gears 46 and 47 will be regulated so that the different slides 74 will come into position at 80 in line with the projector tube 81 of the lens arrangement.

Attached to the vertical arm 67 is also a leaf spring 90 riveted in position at 91 and having a pin 92. The pin 92 which acts as the pivot for the disc G may also be mounted on the front face of the light box 71. The pin 92 will project into an opening 92 (see Fig. 5) in the bracket portion 67 and through the central opening 94 of the disc G, serving as a pivot.

The sides of the disc G will be guided by the side legs 95 of the bracket 96, which is held in position by the cross-bar 97 having the screws 98. The side legs 95 of the bracket 96 may also be formed as part of or to extend away from the bracket 61.

The slot 99 on the top table 11 is slightly larger and wider than the disc G and permits said disc to be inserted between the legs 95 and onto the flange 68, whereupon the pin 92 will snap into the opening 94.

The end of the pin is so rounded, as indicated at 100 that it may be readily cammed out of or into the opening 94, which may also have a bevel edge, if desired.

The box 71 has the side walls 101 and louvres 102 for ventilation purposes. The light box 71 may also be made without side walls 101 and the louvres 102.

The base wall 103 carries the flange 104 of the screw socket 105 of the bulb 106. The removable lid 107 enables removal or replacement of the bulb 106. The lid 107 may be eliminated, if desired.

The lens system H will project the picture directly upon the frosted glass window 16. The glass window 16 may also be eliminated, if desired.

Below the tone arm C, as shown in Figs. 2 and 6, is provided a sector 120 having a pin 121 connected to the lower portion 122 of the tone arm C. This portion 122 projects down through the bearing collar 123.

As shown best in Fig. 6, the bearing collar has a top shoulder 124 upon which the flange 125 of the vertical portion 126 of the tone arm C rests. The lower portion of the bearing structure 123 is flanged outwardly, as indicated at 127, and is held in position by the bolt and screw combination 128 upon the top portion 11.

The pin 121 by means of the collar 129 and the set screw 130 carries the plate 131 with the depending flange portion 132. The flange 132 acts upon the finger 133 of the micro-switch arrangement 134. The micro-switch 134 is held in position by the base flange 135 and the screws 136 at the lower face of the top plate 11.

When the tone arm C is swung into inoperative position, the flange 132 will move downwardly, actuating the pin 137 to stop the rotation of the turn-table B. The micro-switch 134 is also subject to reverse operation. The light 106 is operated by means of the manual switch L.

When the turn-off disc 131 is moved to the position shown in Figs. 2 and 6, the micro-switch will again operate to turn on the turn-table B.

The electrical connections are shown as entering the box at 150 and it will be noted that they extend at 151 to connections at 152 and 153 to conductors 154, 155, 156, 157, 158 and 159 to the light socket 105, the switch L, the micro-switch 134 and the motor E.

Normally, in operation, when the tone arm C is placed in back position, with the head D thrown backwards against the tone arm, a record K may be placed upon the turn-table B. At the same time the disc G may be inserted with the arrow 170 in Fig. 7 aligned with the arrow 171 as shown in Fig. 1, so that there will be registry.

The disc in this position will be held between the depending legs 95 and upon the inturned flange 68 and the pin 92 will snap into the opening 94, serving as a pivot.

In this position the depending portion 132 of Fig. 6 will act upon the arm 133 of the micro-switch 134, disconnecting the electrical connections shown in Fig. 2 at 150 to 158. A reverse operation is also possible.

When the tone arm is turned back to the position as shown in Figs. 1 and 3, the lever 133 of the micro-switch 134 in Fig. 6 is released, closing the circuit through the micro-switch 134, as shown also upon Fig. 2. A reverse operation is also possible.

The manual switch L will operate the lamp 106 and will turn on the projector.

As the turn-table B revolves, it will drive the push member 77, which in turn will drive the disc G through the gearing 46 and 47, the shaft 48 and the gearing 62 and 63. This drive will be synchronized so that the projection of the scenes on the slides 74 will be in accordance with the narrative or music on the record K.

When the record K finishes playing, any or all of the slides 74 will have passed the lens H and the lamp 106 and will have been projected. Sometimes the disc G is made for one side of a record and sometimes it may be made for both sides, or for several records, as the case may be.

In the device of Fig. 8, the micro-switch 134 is carried upon the top plate 11. The pin 137' is actuated directly by the tone arm C', which has the rest 172 when it is in the inactive position. This is an alternative construction to that shown in Fig. 6.

Instead of having bevel gears 45 and 46 and spur gears 62 and 63, it is also possible to have worm and worm wheel combinations and it is also possible to drive this gearing arrangement directly from the motor E instead of from the turn-table B. The advancing pin or stud 77 may also be positioned upon an arm independently driven instead of the gear 63.

The present machine may be used not only in the home or for education of children but also for advertisement in the school or in other connections where it is desirable to have a combination projection of both sound and pictures in synchronism.

Although the switch L operates the projector arrangement and the micro-switch 134 operates the turn-table B, other switching arrangement may be employed.

The disc G normally will carry sufficient pictures for both sides of the record and in one form of the invention it has 26 openings, 13 for each side of the record. If desired, however, there may be one disc for each side of the record or one disc may be utilized for two or more records.

It is also possible to omit the glass 16 and to use the device as a projector to project the pictures on a wall or on a screen.

While there has been herein described a preferred form of the invention, it should be understood that the same may be altered in details and in relative arrangement of parts within the scope of the appended claims.

Having now particularly described and ascertained the nature of the invention, and in what manner the same is to be performed, what is claimed is:

1. A combination phonograph-slide projector serving to drive a flat circular disc record having a spiral sound groove therein and to drive in synchronism therewith intermittently in a step-by- step motion a circular disc having an annular series of pictures positioned adjacent the periphery thereof and having a series of notches one for each picture which will enable the disc to be advanced one picture at a time, said projector comprising a disc sound record rotating table with a shaft, a swingable tone arm to be moved into or out of operative position, a switch operated by said tone arm to turn on the electric power when the tone arm is moved into operative position and to turn off the electric power when the tone arm is moved out of operative position, a slide projector provided with a pocket loosely to receive a picture slide disc carrying slides to be projected and means to synchronize the movement of the disc sound record and the picture slide disc, said means including a gearing arrangement to rotate said picture slide disc together with said table, said synchronizing means including a rotating spring arm to engage the notches at the periphery of said disc and advance said disc one slide in synchronism with the movement of the record.

2. A combination phonograph-slide projector serving to drive a flat circular disc record having a spiral sound groove therein and to drive in synchronism therewith intermittently in a step-by-step motion a circular disc having an annular series of pictures positioned adjacent the periphery thereof and having a series of notches one for each picture which will enable the disc to be advanced one picture at a time, said projector comprising a disc sound record rotating table with a shaft, a swingable tone arm to be moved into or out of operative position, a switch operated by said tone arm to turn on the electric power when the tone arm is moved into operative position and to turn off the electric power when the tone arm is moved out of operative position, a slide projector provided with a pocket loosely to receive a picture slide disc carrying slides to be projected and means to synchronize the movement of the disc sound record and the picture slide disc, said means including a device for intermittently advancing said picture slide disc with said disc sound record, said synchronizing means including a rotating spring arm to engage the notches at the periphery of said disc and advance said disc one slide in synchronism with the movement of the record.

3. A combination phonograph-slide projector serving to drive a flat circular disc record having a spiral sound groove therein and to drive in synchronism therewith intermittently in a step-by-step motion a circular disc having an annular series of pictures positioned adjacent the periphery thereof and having a series of notches one for each picture which will enable the disc to be advanced one picture at a time, said projector comprising a disc sound record rotating table with a motor, a motor shaft, a swingable tone arm to be moved into and out of operative position, a slide projector provided with a pocket loosely to receive a picture slide disc carrying slides to be projected and means to synchronize the movement of the disc sound record and the picture slide disc, and a micro-switch operated by said tone arm to operate the motor.

4. A combination phonograph-slide projector serving to drive a flat circular disc record having a spiral sound groove therein and to drive in synchronism therewith intermittently in a step-by-step motion a circular disc having an annular series of pictures positioned adjacent the periphery thereof and having a series of notches one for each picture which will enable the disc to be advanced one picture at a time, said projector comprising a disc sound record rotating table with a motor, a motor shaft, a swingable tone arm to be moved into and out of operative position, a switch operated by said tone arm to turn on the electric power when the tone arm is moved into operative position and to turn off the electric power when the tone arm is moved out of operative position, a slide projector provided with a pocket loosely to receive a picture slide disc carrying slides to be projected and means to synchronize the movement of the disc sound record and the picture slide disc, said picture slide disc having a notched edge, and a rotatable arm to advance said picture slide disc notch by notch.

5. A combination phonograph-slide projector serving to drive a flat circular disc record having a spiral sound groove therein and to drive in synchronism therewith intermittently in a step-by-step motion a circular disc having an annular series of pictures positioned adjacent the periphery thereof and having a series of notches one for each picture which will enable the disc to be advanced one picture at a time, said projector comprising a disc sound record rotating table with a motor, a motor shaft, a swingable tone arm to be moved into and out of operative position, a switch operated by said tone arm to turn on the electric power when the tone arm is moved into operative position and to turn off the electric power when the tone arm is moved out of operative position, a slide projector provided with a pocket loosely to receive a picture slide disc carrying slides to be projected and means to synchronize the movement of the disc sound record and the picture slide disc, said picture slide disc having a notched edge and a rotatable arm to advance said picture slide disc notch by notch and said synchronizing means including a gearing arrangement driven by the motor shaft and in turn driving said rotatable arm.

6. A synchronized sound and picture projection apparatus of the type to receive a flat circular disc record with a spiral sound groove therein and a flat circular picture disc having a plurality of transparencies positioned in a circular arrangement adjacent the periphery thereof with a plurality of peripheral notches one for each picture, said apparatus having a turntable to receive the record and a pocket to receive the disc and means to drive said record and disc intermittently in synchronism, the pocket being formed by providing a slot adjacent to the turntable, said slot being provided with a metal bracket having spring fingers to contact and position the side edges, the bottom edge and the center of the picture disc.

7. A synchronized sound and picture projection apparatus of the type to receive a flat circular disc record with a spiral sound groove therein and a flat circular picture disc having a plurality of transparencies positioned in a circular arrangement adjacent the periphery thereof with a plurality of peripheral notches one for each picture, said apparatus having a turntable to receive the record and a pocket to receive the disc and means to drive said record and disc intermittently in synchronism, the shaft of the turntable being provided with a gearing arrangement having a spring arm engaging the notches of said picture disc and turning said picture disc one notch for a predetermined number of revolutions of the sound record.

MURRAY RONICK.

REFERENCES CITED

The following references are of record in the file of this patent:

UNITED STATES PATENTS

| Number | Name | Date |
|---|---|---|
| 915,359 | Kirby | Mar. 16, 1909 |
| 1,094,704 | Clubb et al. | Apr. 28, 1914 |
| 1,110,247 | Whitehead | Sept. 8, 1914 |
| 1,584,708 | Billing | May 11, 1926 |
| 1,696,831 | Baker | Dec. 25, 1928 |
| 1,750,991 | Bustamante | Mar. 18, 1930 |
| 2,066,538 | Phelps | Jan. 5, 1937 |
| 2,088,516 | Grier | July 27, 1937 |
| 2,145,743 | Welch | Jan. 31, 1939 |
| 2,351,238 | Teuber | June 13, 1944 |
| 2,513,673 | Prell | July 4, 1950 |